US012665178B2

(12) United States Patent
Dziekonski

(10) Patent No.: US 12,665,178 B2
(45) Date of Patent: Jun. 23, 2026

(54) SYSTEMS AND METHODS FOR MULTISTAGE MASS SPECTROMETRY UTILIZING AN ELECTROSTATIC ION TRAP

(71) Applicant: DH TECHNOLOGIES DEVELOPMENT PTE. LTD., Singapore (SG)

(72) Inventor: Eric Thomas Dziekonski, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 438 days.

(21) Appl. No.: 18/032,251

(22) PCT Filed: Sep. 14, 2021

(86) PCT No.: PCT/IB2021/058375
§ 371 (c)(1),
(2) Date: Apr. 17, 2023

(87) PCT Pub. No.: WO2022/084764
PCT Pub. Date: Apr. 28, 2022

(65) Prior Publication Data

US 2023/0402272 A1 Dec. 14, 2023

Related U.S. Application Data

(60) Provisional application No. 63/093,572, filed on Oct. 19, 2020.

(51) Int. Cl.
*H01J 49/06* (2006.01)
*H01J 49/00* (2006.01)
(Continued)

(52) U.S. Cl.
CPC .......... *H01J 49/009* (2013.01); *H01J 49/061* (2013.01); *H01J 49/063* (2013.01); *H01J 49/405* (2013.01);
(Continued)

(58) Field of Classification Search
CPC ...... H01J 49/009; H01J 49/061; H01J 49/063; H01J 49/405; H01J 49/408; H01J 49/4245
See application file for complete search history.

(56) References Cited

U.S. PATENT DOCUMENTS

2003/0071206 A1* 4/2003 Belov .................. H01J 49/004 250/282
2009/0206248 A1* 8/2009 Makarov ................ H01J 49/06 250/424
(Continued)

FOREIGN PATENT DOCUMENTS

JP 2010146876 7/2010
WO 2019/236142 12/2019
WO 2020/121168 6/2020

OTHER PUBLICATIONS

International Search Report and Written Opinion corresponding to International Patent Application No. PCT/IB2021/058375, mailed Dec. 23, 2021.

*Primary Examiner* — David E Smith
(74) *Attorney, Agent, or Firm* — Lathrop GPM LLP; Malaika O.D. Tyson; Jason Kuchar

(57) ABSTRACT

Systems and methods are disclosed for ion injection into an electrostatic trap. Various aspects of this disclosure provide a mass spectrometer system including a primary ion path including a plurality of quadrupoles; and a secondary ion path coupled to the primary ion path utilizing turning elements. The secondary ion path may include an electrostatic linear ion trap (ELIT), the ELIT being operable to
(Continued)

analyze ions diverted from the primary ion path and return them to the primary ion path. The primary ion path may include a time-of-flight mass analyzer. The secondary ion path may be bi-directional. Ions may travel in a first direction when coupled into the secondary ion path using a first turning element in the primary ion path and may travel in a second direction when coupled into the secondary ion path utilizing a second turning element in the primary ion path. The secondary ion path may include a collision quadrupole.

20 Claims, 7 Drawing Sheets

(51) Int. Cl.
*H01J 49/40* (2006.01)
*H01J 49/42* (2006.01)

(52) U.S. Cl.
CPC ........ *H01J 49/408* (2013.01); *H01J 49/4245* (2013.01)

(56) References Cited

U.S. PATENT DOCUMENTS

2009/0218486 A1* 9/2009 Whitehouse .......... H01J 49/063 250/288
2016/0169837 A1* 6/2016 Bateman ............... H01J 49/062 250/281

* cited by examiner

SYSTEMS AND METHODS FOR MULTISTAGE MASS SPECTROMETRY UTILIZING AN ELECTROSTATIC ION TRAP

CROSS-REFERENCE TO RELATED APPLICATIONS/INCORPORATION BY REFERENCE

The present patent application is filed pursuant to 35 U.S.C. 371 as a U.S. National Phase application of International Patent Application No. PCT/IB2021/058375, which was filed Sep. 14, 2021, and is related to and claims the priority benefit of U.S. Provisional Patent Application Ser. No. 63/093,572, filed Oct. 19, 2020, the content of each is hereby incorporated by reference in its entirety into this disclosure.

BACKGROUND

Conventional approaches for multistage mass spectrometry may be costly, cumbersome, and/or inefficient—e.g., they may be complex and/or difficult to implement, and may exhibit poor resolution and/or efficiency.

SUMMARY

Figure 1:
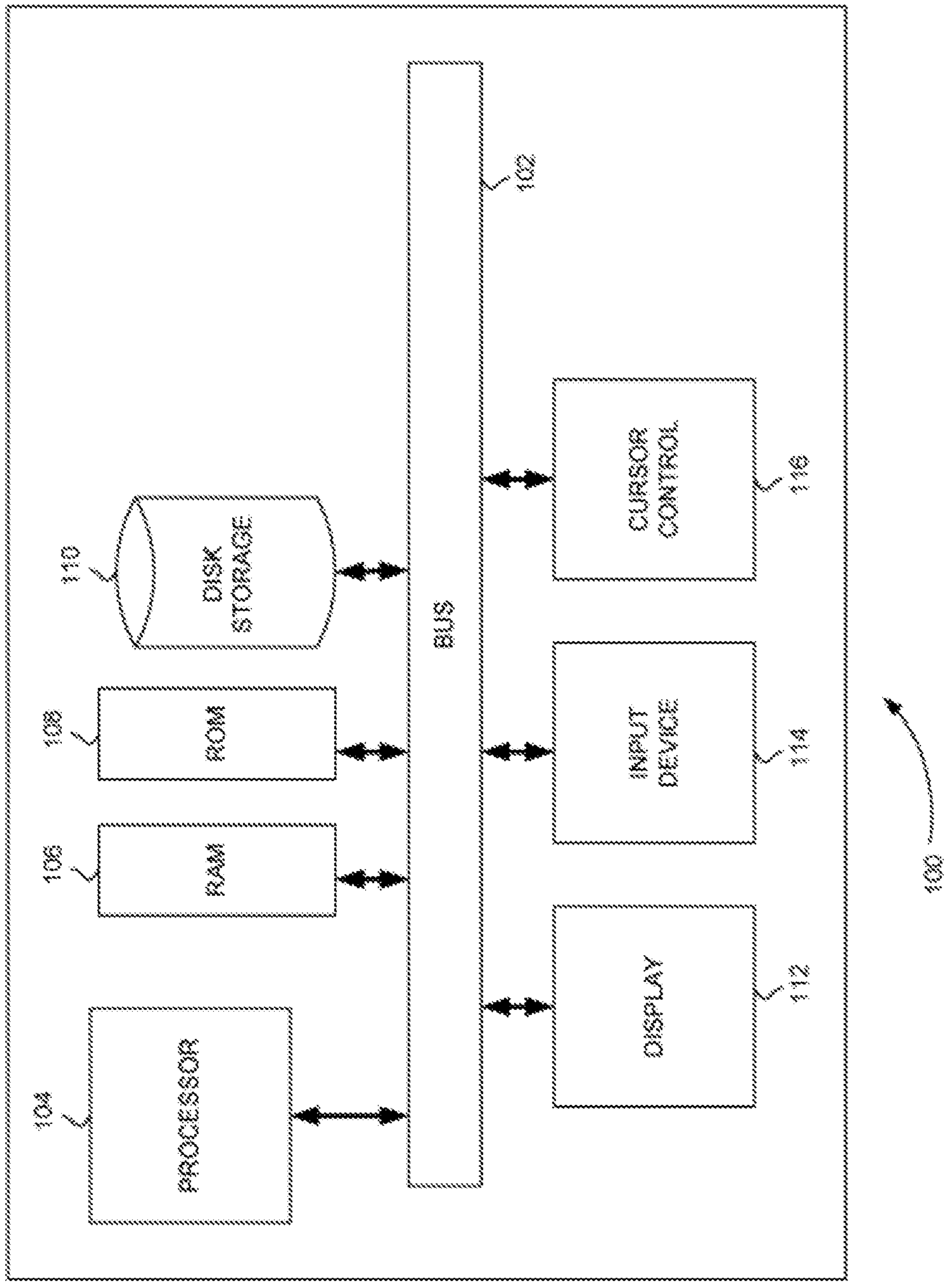
FIG. 1 is a block diagram that illustrates a computer system, upon which embodiments of the present teachings may be implemented.

Various aspects of this disclosure provide systems and methods for ion injection into an electrostatic trap. As non-limiting examples, various aspects of this disclosure provide a mass spectrometer system comprising a primary ion path comprising a plurality of quadrupoles; and a secondary ion path coupled to the primary ion path utilizing turning elements. The secondary ion path may comprise an electrostatic linear ion trap (ELIT), the ELIT being operable to analyze ions diverted from the primary ion path and return them to the primary ion path.

The primary ion path may comprise a time-of-flight mass analyzer. The secondary ion path may be bi-directional. Ions may travel in a first direction when coupled into the secondary ion path using a first turning element in the primary ion path and may travel in a second direction when coupled into the secondary ion path utilizing a second turning element in the primary ion path. The secondary ion path may comprise a collision quadrupole.

The quadrupole in the secondary ion path may comprise an accumulation quadrupole. The secondary ion path may comprise an injection quadrupole operable to inject ions into the ELIT. One of the plurality of quadrupoles in the primary ion path may comprise a bent quadrupole. The secondary ion path may be operable to cycle ions multiple times before analyzing the ions in the ELIT. The primary ion path may comprise a detector for analyzing ions after passing through the secondary ion path one or more times.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

The current state of product development, and scientific advancement in general, for example in the life sciences, is hampered by current systems and methods, adding literally years to product and/or scientific development cycles.

FIG. 1 is a block diagram that illustrates a computer system, upon which embodiments of the present teachings may be implemented. Computer system 100 may comprise a bus 102 or other communication mechanism for communicating information, and a processor 104 coupled with bus 102 for processing information. Computer system 100 may also comprise a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 may comprise a read only memory (ROM) 108 or other static storage device coupled to bus 102 for storing static information and instructions for processor 104. A storage device 110, such as a magnetic disk or optical disk, may be provided and coupled to bus 102 for storing information and instructions.

Computer system 100 may be coupled via bus 102 to a display 112, such as a light emitting diode (LED) or liquid crystal display (LCD), for displaying information to a computer user. An input device 114, including alphanumeric and other keys, may be coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 may be connected to one or more other computer systems, like computer system 100, across a network to form a networked system. The network may comprise a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a communications link. A modem local to computer system 100 can receive the data on the link and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method may be stored on a computer-readable medium. The computer-readable medium may comprise a device that stores digital information. For example, a computer-readable medium includes a compact disc read-only memory (CD-ROM), universal serial bus (USB) drive, or other storage device as is known in the art for storing software. The computer-readable medium may be accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

In an example scenario, the computer system 100 may be operable to control a mass spectrometer system, such as the system described with respect to FIGS. 2-6. Accordingly, the computer system 100 may be operable to control circuitry for controlling primary and secondary ion paths, enabling multiple passes of ion packets, and injecting ions into subsequent blocks for processing. For example, a turning element may be configured to divert ions from a primary ion path to a secondary ion path while a second turning element may couple the diverted ion packet back into the primary ion path. This process may be repeated as many times as desired. The computer system 100 may also be operable for reading measurements based on the injected ions, such as detector outputs, for example.

Figure 2:
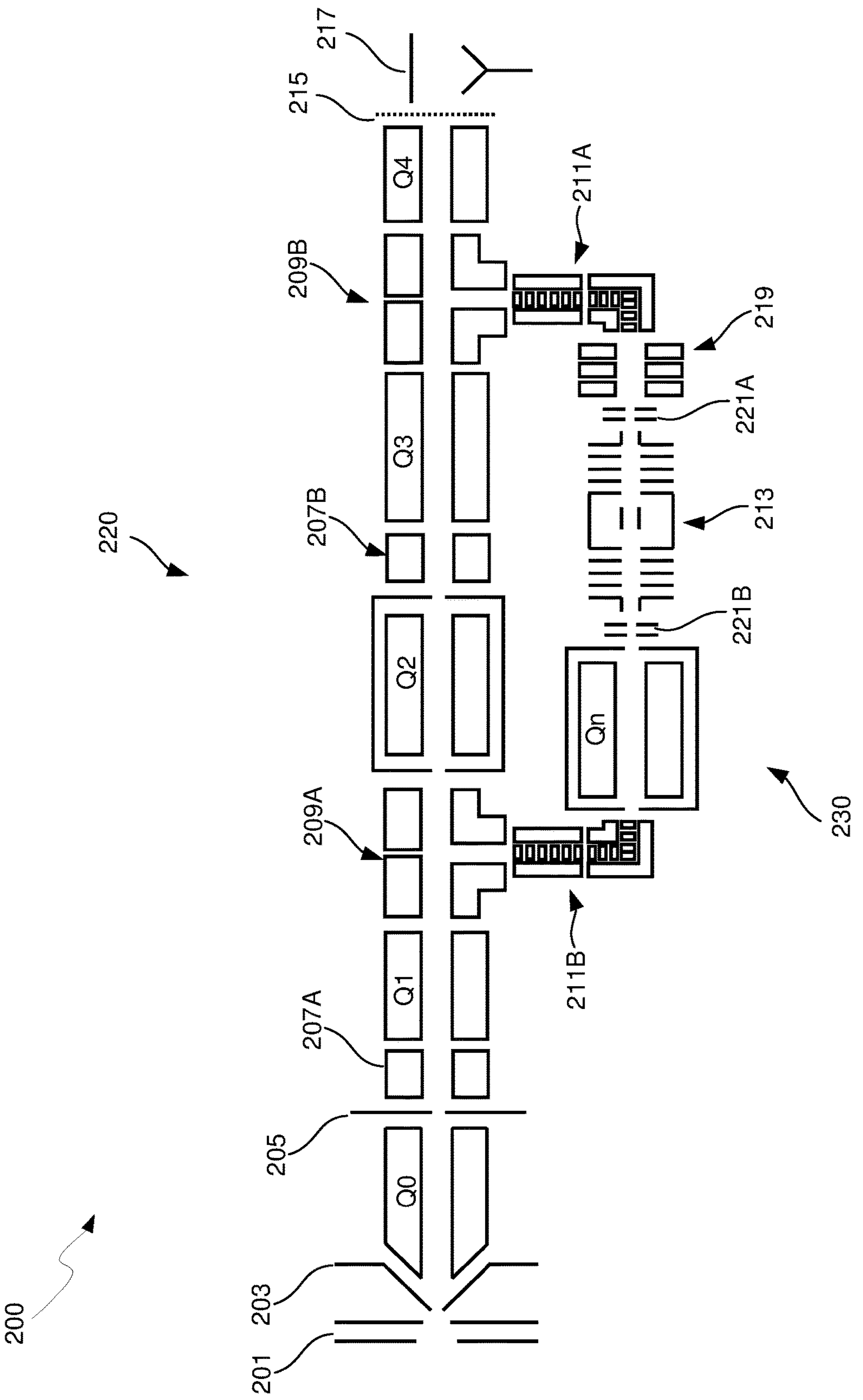
FIG. 2 is a schematic diagram of a mass spectrometer system, in accordance with an example embodiment of the disclosure.

FIG. 2 is a schematic diagram of a mass spectrometer system, in accordance with an example embodiment of the disclosure. Referring to FIG. 2, there is shown mass spectrometer 200 comprising quadrupoles Q0-Q4 and Qn, orifice plates 201 and 205, skimmer 203, additional stubby rods 207A and 207B, turning elements 209A and 209B, structures for lossless ion manipulation (SLIMs) 211A and 211B, electrostatic linear ion trap (ELIT) 213, exit lens 215, amplifier 217, and injection quad 219.

The mass spectrometer 200 comprises a primary ion path 220, or quadrupole axis, and a secondary ion path 230, with the primary and secondary ion paths coupled via turning elements 209A and 209B. In this example, the primary ion path 220 comprises the quadrupoles Q0-Q4, stubby rods 207A and 207B, while the secondary ion path 230 comprises the SLIMs 211A and 211B, ELIT 213, injection quad 219, and transfer optics 221A and 221B.

The quadrupoles Q0-Q4 and Qn comprise four electrodes/poles that may be biased with DC and/or AC voltages for capturing, confining, and ejecting charged ions. The electrodes may be cylindrical or may have a hyperbolic shape, for example.

The orifice plates 201 and 205 may comprise plates with an orifice formed therein for allowing ions to pass through but with the orifice being small enough to enable a pressure difference between chambers, such as between Q0 and Q2, for example, where Q2 may be at a higher pressure as a collision chamber.

The stubby rods 207A and 207B may comprise shorter rods, as compared to Q0-Q4 and Qn, that guide ions between Q0, Q2, and Q3, and may also be biased with DC and/or RF fields for transporting ions confined along a central axis. The ELIT 213 may comprise electrode plates at the entrance and exit sides of the ELIT 213, with a pickup electrode centered within the electrode plates. The electrode plates have holes for allowing ions to pass, where the plates are biased such that the ions oscillate radially and are also reflected back in the axial direction, thereby causing the ions to oscillate within the ELIT 213. These plates are also known as reflectron plates. As ions pass through the pickup electrode, a current is induced, which may be sensed and amplified. In addition, the detector 217 may comprise an electron multiplier, for example, that senses the number of charged ions exiting the primary ion path 220.

In an example scenario, the ELIT 213 comprises a DC-only ion trap, where ions may be injected at 1-2 keV, for example. The reflectron plates at the end reflect the ions, and the output signal generated from a tube in the ELIT may be proportional to the number of ions, and may be inductively coupled to sensing circuitry, controlled by a processor, such as processor 104. Gates in the ELIT 213 make it a bi-directional device, where timing of the gates can isolate ions by timing the opening, where an objective of the ELIT is to concentrate the ions after each isolation.

The transfer optics 221A and 221B may comprise electrostatic lenses that may be operable to focus ions in the same location irrespective of m/z, such that desired ions are accurately injected into the ELIT 213 from either direction depending on which turning element 209A/209B directs ions into the secondary ion path 230.

During operation of the mass spectrometer 200, ions may be admitted into primary ion path 220 through orifice plates 201 and skimmer 203. Ions may be collisionally cooled in Q0, which may be maintained at a low pressure, such as less than 100 mTorr, for example. Quadrupole Q1 may operate as transmission RF/DC quadrupole mass filter. Q2 may comprise a collision cell in which ions collide with a collision gas, such as nitrogen, for example, to be fragmented into products of lesser mass. Ions may be trapped radially in any of Q0-Q4 and Qn by RF voltages applied to the rods and axially by DC voltages applied to end aperture lenses and/or stubby quadrupoles and/or orifice plates in the quadrupoles.

According to aspects of the present disclosure, an auxiliary RF voltage may be provided to end rod segments, end lenses, and/or orifice plates of one of the rod sets to provide a pseudo potential barrier. By this means, both positive and negative ions may be trapped within a single rod set or cell. Typically, positive and negative ions would be trapped within the high pressure Q2 cell. Once the positive and negative ions within Q2 have reacted, they can be directed through the secondary ion path 230 for further confinement and/or collision, and passing through ELIT 213 for isolation and/or analysis.

Using two ion optical elements, such as turning elements 209A and 209B, ions may be steered off the primary ion path 220 to the secondary ion path 230 that may run parallel to the axis of the primary ion path 220, and may comprise injection quadrupoles, transfer optics, ELIT, and accumulation quadrupole. It should be noted that additional quadrupoles, Q3 and stubby rods 207B are shown in the primary ion path 220 to span the distance between the turning elements. These may or may not be needed, depending on the ion optical elements contained within the secondary ion path and/or their configuration. Also, ions are shown to be transported to the injection quad 219 and from the accumulation quadrupole Qn via the SLIMs 211A and 211B. One skilled in the art will appreciate that these could be any ion optical element capable of transporting ions (quadrupoles, bent quadrupoles hexapoles, octupoles, etc.).

In an example embodiment, the primary ion path 220 may be used like a normal triple quadrupole mass spectrometer, giving the user high sensitivity and linear dynamic range (LDR), and fast analysis. In another embodiment, ions could be steered towards the injection quad 219 and mass analyzed via FT or MR-TOF within the ELIT, giving the user high resolution mass analysis. While ions are being analyzed in the ELIT 213, the primary ion path 220 may still be used to perform MS or MS/MS scans at a substantially higher rate with output signals from the channel electron multiplier (CEM) 217, for example.

In another example embodiment, a parent could be isolated using the ELIT 213 and recaptured in the accumulation quadrupole Qn. Thermalized ions could be released from the accumulation quadrupole Qn and fragmented in Q2 after which they could be analyzed via FT/MR-TOF in the ELIT 213, or via electron multiplier 217 from Q4. This scenario represents a high isolation resolution MS/MS.

Multistage mass spectrometry, $MS^n$, may be performed by sending ions around the primary/secondary ion paths multiple times, after which the ELIT 213 or CEM 217 may be used as the readout. To increase the signal-to-noise of the measurement and yield better ion statistics, the ion population resulting from $MS^n$ may be stored in Q4. The process may then be repeated on new ion populations, after which they are added to the existing population in Q4. The final mass analysis step could be performed via FT/MR-TOF in the ELIT 213 with the ions ejected back into the secondary ion path 230, or via ejecting to the electron multiplier 217 from Q4.

Prior to ion isolation in the ELIT 213, a crude isolation (several Daltons wide) may be performed in Q3 to limit the space charge and propensity for peak coalescence in the ELIT 213. Isolated parent ions may be chemically modified in the accumulation via ion/ion or ion/molecule reactions to promote specific cleavages, perform hydrogen/deuterium exchange (HDX) mass spectrometry, etc.

The injection and extraction transfer optics to the ELIT 213 may be optimized independently to reduce ion loss on the lenses and differential apertures. In this example scenario, the ELIT 213 would be uni-directional using transfer optics 221A for injection, where ions would loop around the ion path to be reanalyzed in the ELIT 213. One skilled in the art could appreciate that injection optics may be placed on either, or both, sides of the ELIT 213, thereby making the ion path bi-directional, where ions may be analyzed in the ELIT 213 multiple times without having to enter the primary ion path 220, the quadrupole axis, thereby leaving it open to perform MS or MS/MS scans concurrently.

The mass spectrometer system 200 and those shown in FIGS. 3-7 have the advantages of a triple quadrupole or TOF mass spectrometer with the added ability to perform high resolution mass analysis with very high-resolution ion isolation, collision cross section determination, non-destructive detection, and MR-TOF analysis. Isolated ion populations can be stored and concentrated via multiple injections. Low resolution quadrupole isolations can be performed before each high-resolution ion isolation in the ELIT to limit the number of injected charges and prevent peak coalescence. High transmission efficiency through the ELIT is enabled due to independently optimized injection/ejection ion optics.

For example, a high-resolution ion isolation of ~70k ions may be performed in 200 μs, where higher resolution is possible with longer flight times. In principle, the isolation resolution is limited by the background pressure and onset of peak coalescence. In addition, high resolution $MS^n$ is enabled by the primary and secondary ion path, with an option to modify ion population after each high-res isolation, e.g. HDX, ion/ion reactions.

Furthermore, the system provides the ability to build the final ion population (after all isolation/modification steps) to enhance the S/N of the final high-resolution mass analysis step in the ELIT. As the ELIT does not typically have single ion detection limits, this enhancement may be needed to achieve good ion statistics.

The dual path configuration also enable the Isolation resolution of the ELIT, but also the abundance sensitivity and LDR of a quadrupole/TOF, depending on the final mass analyzer used. Also, can use the ELIT as an FT-MS for high resolution mass analysis. Multiple scans are enabled in the main ion path quadrupole while the ELIT is performing a single acquisition. Also, the ion path may be reused with multiple passes instead of using an extended structure, requiring a smaller footprint, less electronics, and lower overall cost. The use of an ELIT or quad/TOF as the readout depending on the experimental constraints allows for a single instrument to be used for many different end-users.

Fourier transform analysis also adds the ability to determine the collisional cross section of isolated ions or all ions simultaneously. Combined with DMS, one could determine the CCS of isobars. Optimized ion optics for ion injection and ejection (recapture) from the ELIT may maximize transmission efficiency and sensitivity. Quads can be used to perform a crude ion isolation prior to analysis in the ELIT, thereby limiting the number of injected charges and delaying the onset of peak coalescence.

Furthermore, the mass spectrometer system disclosed here eliminates unwanted ions at high speed, allowing an ion population to be built, which helps solve the problem of diminishing fragment ion signal during successive MSMS or $MS^n$ events that can put the number of circulating ions in an ELIT below the detection threshold.

In addition, multiplexing of the ion signal during ELIT analysis is enabled, greatly enhancing the instrument duty cycle over conventional single-analyzer electrostatic traps (including Orbitraps). This arises because the instrument can carry out ion processing during the ELIT measurement period, and allows for very high resolution ion isolation. Therefore, the system disclosed here provides higher S/N, higher isolation efficiencies, and the capabilities to perform more sophisticated ion processing, while maintaining the characteristics of a triple quad instrument at the same time.

Figure 3:
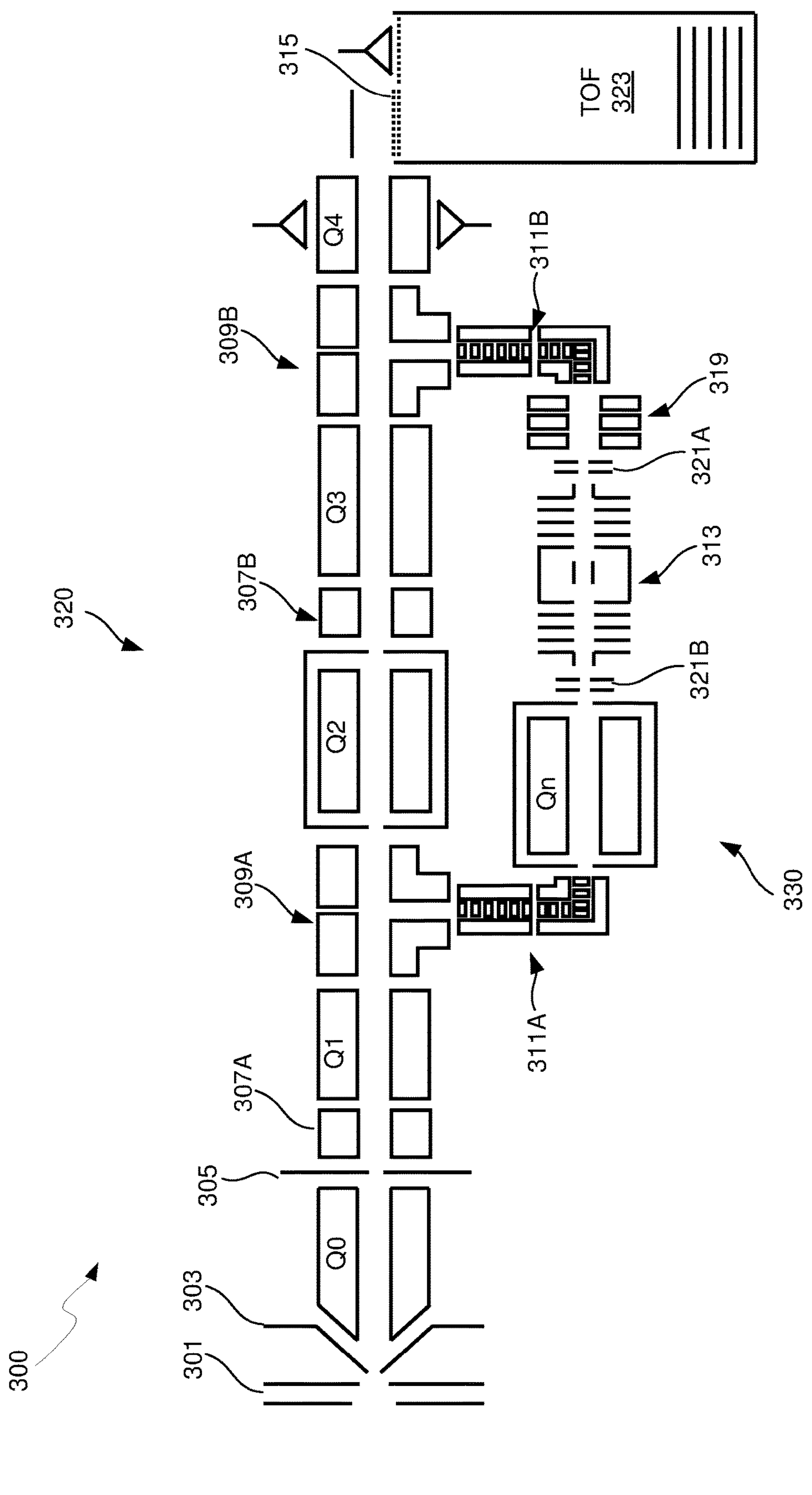
FIG. 3 illustrates a schematic diagram of a linear ion trap mass spectrometer system with a secondary ion path and a downstream time-of-flight (TOF) mass analyzer, in accordance with an example embodiment of the disclosure

FIG. 3 illustrates a schematic diagram of a linear ion trap mass spectrometer system with a secondary ion path and a downstream time-of-flight (TOF) mass analyzer, in accordance with an example embodiment of the disclosure. Referring to FIG. 3, there is shown mass spectrometer system 300 comprising a primary ion path 320 and a secondary ion path 330.

The mass spectrometer system 300 may comprise quadrupoles Q0-Q4 and Qn, orifice plates 301 and 305, skimmer 303, additional stubby rods 307A and 307B, turning elements 309A and 309B, SLIMs 311A and 311B, ELIT 313, exit lens 315, injection quadrupole 319, and time-of-flight analyzer 323.

The mass spectrometer 300 comprises a primary path 320, or quadrupole axis, and a secondary ion path 330, with the primary and secondary ion paths coupled via turning elements 309A and 309B. In this example, the primary path 320 comprises the quadrupoles Q0-Q4, stubby rods 307A and 307B, exit lens 315, and TOF mass analyzer 323, while the secondary ion path 330 comprises the SLIMs 311A and 311B, ELIT 313, injection quadrupole 319, and transfer optic 31A and 321B.

The quadrupoles Q0-Q4 and Qn comprise four electrodes/poles that may be biased with DC and/or AC voltages for capturing, confining, and ejecting charged ions. The electrodes may be cylindrical or may have a hyperbolic shape, for example.

Using two ion optical elements, such as turning elements 309A and 309B, ions may be steered off the primary ion path 320 to the secondary ion path 330 that may run parallel to the axis of the primary ion path 320, and may comprise injection quadrupoles, transfer optics, ELIT, and accumulation quadrupole. Also, ions are shown to be transported to the injection quad 319 and from the accumulation quadrupole Qn via the SLIMs 311A and 311B. One skilled in the art will appreciate that these could be any ion optical element capable of transporting ions (quadrupoles, bent quadrupoles, hexapoles, octupoles, etc.).

In an example embodiment, the primary ion path 320 may be used like a normal triple quadrupole mass spectrometer with TOF mass analyzer 323, giving the user high sensitivity and linear dynamic range (LDR), and fast analysis. In another embodiment, ions could be steered towards the injection quad 319 and mass analyzed via FT or MR-TOF within the ELIT, giving the user high resolution mass analysis. While ions are being analyzed in the ELIT 313, the primary ion path 320 may still be used to perform MS or MS/MS scans at a substantially higher rate with output signals from the TOF mass analyzer 323, for example.

In another example embodiment, a parent could be isolated using the ELIT 313 and recaptured in the accumulation quadrupole Qn. Thermalized ions could be released from the accumulation quadrupole Qn and fragmented in Q2 after which they could be analyzed via FT/MR-TOF in the TOF mass analyzer 323. This scenario represents a high isolation resolution MS/MS.

Multistage mass spectrometry, MS$^n$, may be performed by sending ions around the primary/secondary ion paths multiple times, after which the ELIT 313 or TOF mass analyzer 323 may be used as the readout. To increase the signal-to-noise of the measurement and yield better ion statistics, the ion population resulting from MS$^n$ may be stored in Q4. The process may then be repeated on new ion populations, after which they are added to the existing population in Q4. The final mass analysis step could be performed via FT/MR-TOF in the TOF mass analyzer 323.

Prior to ion isolation in the ELIT 313, a crude isolation (several Daltons wide) may be performed in Q3 to limit the space charge and propensity for peak coalescence in the ELIT 313. Isolated parent ions may be chemically modified in the accumulation via ion/ion or ion/molecule reactions to promote specific cleavages, perform hydrogen/deuterium exchange (HDX) mass spectrometry, etc.

The injection and extraction transfer optics to the ELIT 313 may be optimized independently to reduce ion loss on the lenses and differential apertures. In this example scenario, the ELIT 313 would be unidirectional using transfer optics 321A for injection, where ions would loop around the ion path to be reanalyzed in the ELIT 313. One skilled in the art could appreciate that injection optics may be placed on either, or both, sides of the ELIT 313, thereby making the ion path bidirectional, where ions may be analyzed in the ELIT 313 multiple times without having to enter the primary ion path 320, the quadrupole axis, thereby leaving it open to perform MS or MS/MS scans concurrently.

For TOF analysis, ions may be ejected from quadrupole Q4 and/or other intermediate ion optical elements such as the inlet aperture 315 such that the ions enter time-of-flight mass spectrometer 323 at a known time. Within the TOF mass analyzer 323, all of the ions may be subjected to the same electrical field, and be allowed to drift in a region of constant electrical energy. As a result, the ions will traverse this drift region in a time and arrive at a detector in a time window that depends upon their m/z ratios. In some embodiments, a controller or processor, such as processor 104 may control the TOF mass analyzer 323 to detect only those ions that traverse the drift zone of the TOF mass analyzer 323 in an amount of time that ions of the first selected m/z, will take. Alternatively, the detector in TOF mass analyzer 323 may detect both the selected and unselected ions. A time window for the selected ions to reach the detector would also be determined. Then, all of the signals received outside of this time window, which would typically correspond to ions of unselected m/z being detected by TOF mass analyzer 323, would be filtered out.

Figure 4:
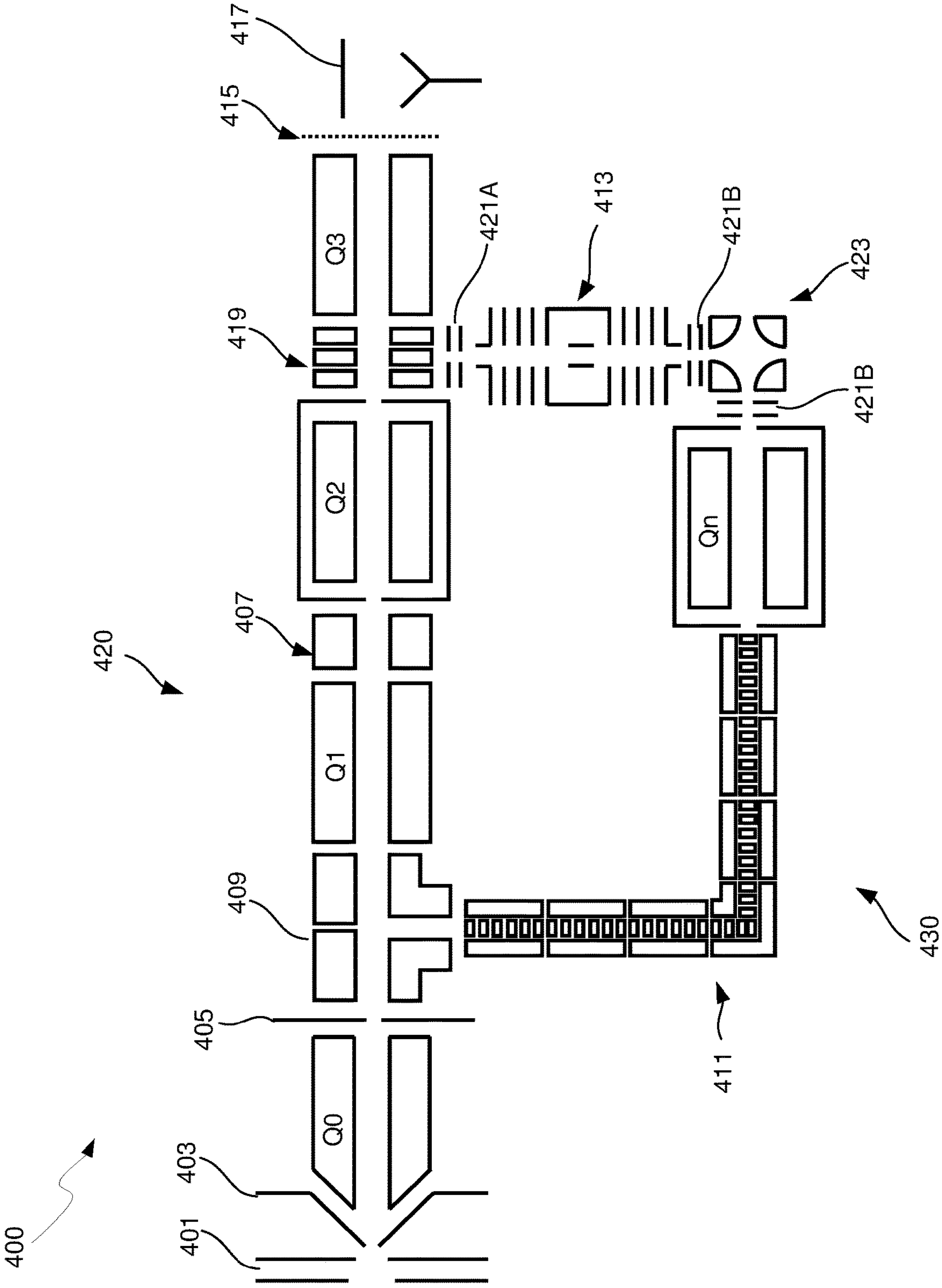
FIG. 4 illustrates a schematic diagram of an alternative embodiment of a mass spectrometer system, in accordance with an example embodiment of the disclosure.

FIG. 4 illustrates a schematic diagram of an alternative embodiment of a mass spectrometer system, in accordance with an example embodiment of the disclosure. Referring to FIG. 4, there is shown mass spectrometer 400 comprising a main ion path 420 and a secondary ion path 430. In this example, the main ion path comprises quadrupoles Q0-Q3, orifice plates 401 and 405, skimmer 403, additional stubby rods 407, turning element 409, SLIM 411, ELIT 413, exit lens 415, CEM 417, radial extraction quadrupole 419, transfer optics 421A and 421B, and turning quad 423.

The mass spectrometer 400 comprises a primary ion path 420, or quadrupole axis, and a secondary ion path 430, with the primary and secondary ion paths coupled via turning elements 409 and the radial extraction quadrupole 419. In this example, the primary ion path 420 comprises the quadrupoles Q0-Q3, stubby rods 407, exit lens 415, and CEM 417, while the secondary ion path 430 comprises SLIM 411, ELIT 413, transfer optics 421A and 421B, accumulation quadrupole Qn, and turning quadrupole 423.

The radial extraction quadrupole 419 in this example comprises a three-segment quadrupole, where an orifice in the second segment enables radial extraction from the quadrupole, i.e., perpendicular to the incoming axis. The turning quadrupole 423 may comprise four poles with a hyperbolic or cylindrical section shape that enable the redirection of ions at 90 degree angles from the incoming direction. In this case, the turning quadrupole 423 may receive ions ejected from the ELIT via the transfer optics 421A and inject into the accumulation quadrupole Qn via transfer optics 421B.

In this example, the turning element 409 and/or radial extraction quadrupole 419 steer ions off the primary ion path 420 to the secondary ion path 430 that may run parallel to the axis of the primary ion path 420, and may comprise injection quadrupoles, transfer optics, ELIT, and accumulation quadrupole. The SLIM 411 may be include a bend/turn for directing ions back to the primary ion path 420. One skilled in the art will appreciate that these could be any ion optical element capable of transporting ions (quadrupoles, bent quadrupoles, hexapoles, octupoles, etc.). The secondary ion path may be uni-directional or bi-directional, as described for the embodiments of FIGS. 2 and 3 above, depending on whether turning element 409 or radial extraction quadrupole 419 is used to deflect ions into the secondary ion path 430.

In an example embodiment, the primary ion path 420 may be used like a normal triple quadrupole mass spectrometer, giving the user high sensitivity and linear dynamic range (LDR), and fast analysis. In another embodiment, ions could be steered towards the ELIT 413, giving the user high resolution mass analysis. While ions are being analyzed in the ELIT 413, the primary ion path 420 may still be used to perform MS or MS/MS scans at a substantially higher rate with output signals from the channel electron multiplier (CEM) 417, for example.

In another example embodiment, a parent could be isolated using the ELIT 413 and recaptured in the accumulation quadrupole Qn. Thermalized ions could be released from the accumulation quadrupole Qn and fragmented in Q2 after which they could be analyzed via FT/MR-TOF in the ELIT 413, or CEM 417 from Q3. This scenario represents a high isolation resolution MS/MS.

Multistage mass spectrometry, MS$^n$, may be performed by sending ions around the primary/secondary ion paths multiple times, after which the ELIT 413 or CEM 417 may be used as the readout. To increase the signal-to-noise of the measurement and yield better ion statistics, the ion population resulting from MS$^n$ may be stored in Q3. The process may then be repeated on new ion populations, after which they are added to the existing population in Q3. The final mass analysis step could be performed via FT/MR-TOF in the ELIT 413 with the ions ejected back into the secondary ion path 430, or via ejecting to the electron multiplier 417 from Q3.

Figure 5:
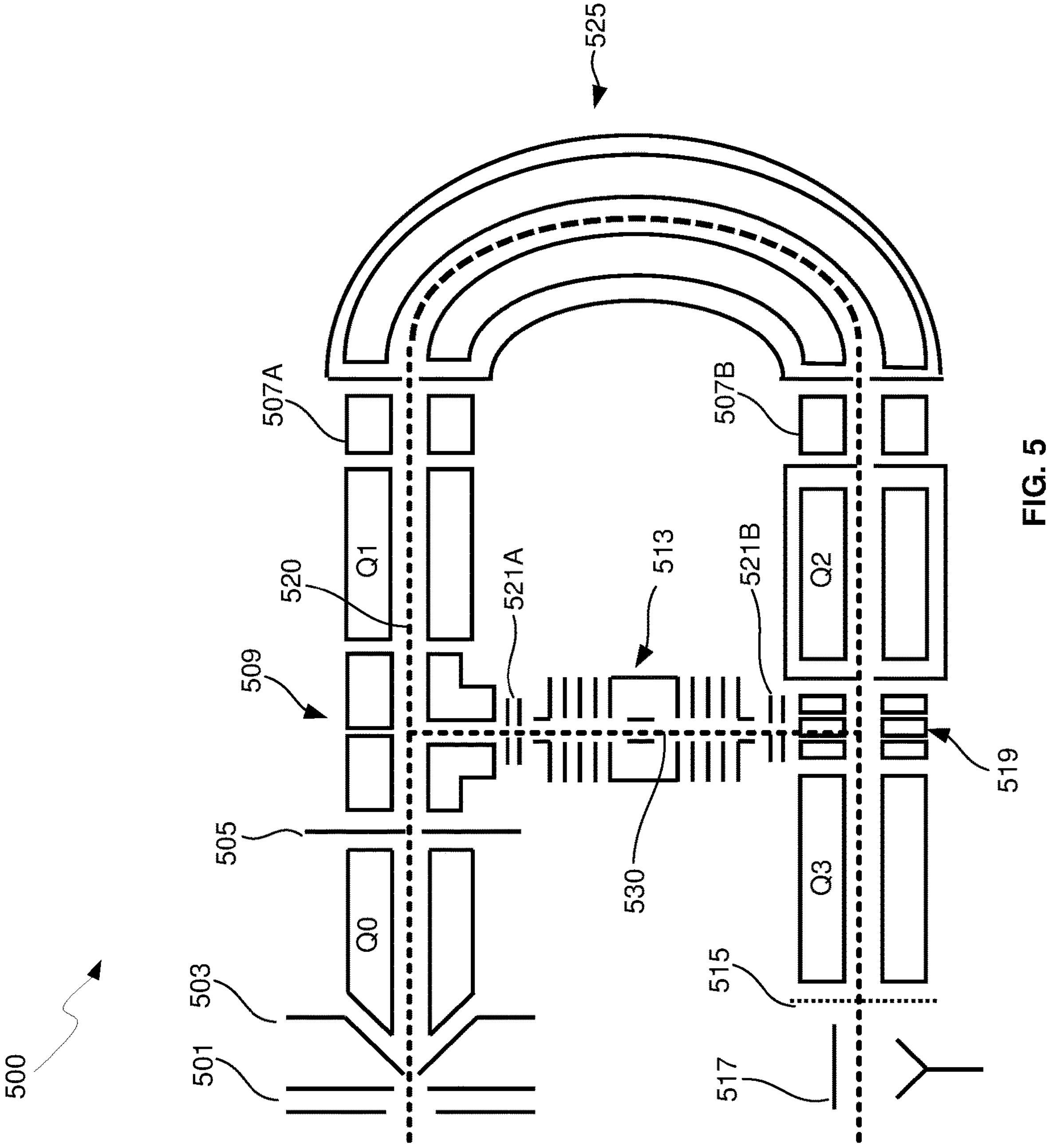
FIG. 5 illustrates a schematic diagram of another alternative embodiment of a mass spectrometer system, in accordance with an example embodiment of the disclosure.

FIG. 5 illustrates a schematic diagram of another alternative embodiment of a mass spectrometer system, in accordance with an example embodiment of the disclosure. Referring to FIG. 5, there is shown mass spectrometer 500 comprising a main ion path 520 and a secondary ion path 530, the paths indicated by dashed lines. In this example, the main ion path comprises quadrupoles Q0-Q3, orifice plates 501 and 505, skimmer 503, additional stubby rods 507A and 507B, turning element 509, exit lens 515, CEM 517, radial extraction quadrupole 519, and bent quadrupole 525, while the secondary ion path 530 comprises ELIT 513 and transfer optics 521A and 521B.

The primary ion path 520, or quadrupole axis, and secondary ion path 530 may be coupled via turning element 509 and radial extraction quadrupole 519. The bent quadrupole 525 may comprise four poles with a hyperbolic or cylindrical cross-sectional shape bent over a desired radius to provide 180 degree ion redirection, enabling the output ion path to be directly opposite to that at the input. In this case, the bent quadrupole 525 may receive ions ejected from Q1 via the stubby rods 507A and inject them into Q2 via the stubby rods 507B, or if ions are directed through the secondary ion path 530, they may be directed into the bent quadrupole 525 via the stubby rods 507B and fed back to the secondary ion path via the stubby rods 507A, Q1, and turning element 509, indicating the bidirectional capability of the mass spectrometry system 500.

In this example, the turning element 509 or radial extraction quadrupole 519 may steer ions off the primary ion path 520 to the secondary ion path 530 that in this example runs perpendicular to the axis of the primary ion path 520. One skilled in the art will appreciate that each path may comprise any ion optical element capable of transporting ions (quadrupoles, bent quadrupoles, hexapoles, octupoles, etc.). The secondary ion path may be uni-directional or bi-directional, as described for the embodiments of FIGS. 2-4 above, depending on whether turning element 509 or radial extraction quadrupole 519 is used to deflect ions into the secondary ion path 530.

In an example embodiment, the primary ion path 520 may be used like a normal triple quadrupole mass spectrometer, giving the user high sensitivity and linear dynamic range (LDR), and fast analysis. In another embodiment, ions could be steered towards the ELIT 513, giving the user high resolution mass analysis. While ions are being analyzed in the ELIT 513, the primary ion path 520 may still be used to perform MS or MS/MS scans at a substantially higher rate with output signals from the channel electron multiplier (CEM) 517, for example.

In another example embodiment, a parent could be isolated using the ELIT 513 and recaptured in the quadrupole Q1 or Q2. Thermalized ions could be released from quadrupole Q1, for example, and fragmented in Q2 after which they could be analyzed via FT/MR-TOF in the ELIT 513, or CEM 517 from Q3. This scenario represents one possible way to perform a high isolation resolution MS/MS.

Multistage mass spectrometry, $MS^n$, may be performed by sending ions around the primary/secondary ion paths multiple times, after which the ELIT 513 or CEM 517 may be used as the readout. To increase the signal-to-noise of the measurement and yield better ion statistics, the ion population resulting from $MS^n$ may be stored in Q3. The process may then be repeated on new ion populations, after which they are added to the existing population in Q3. The final mass analysis step could be performed via FT/MR-TOF in the ELIT 513 with the ions ejected back into the secondary ion path 530, or via ejecting to the electron multiplier 517 from Q3.

Figure 6:
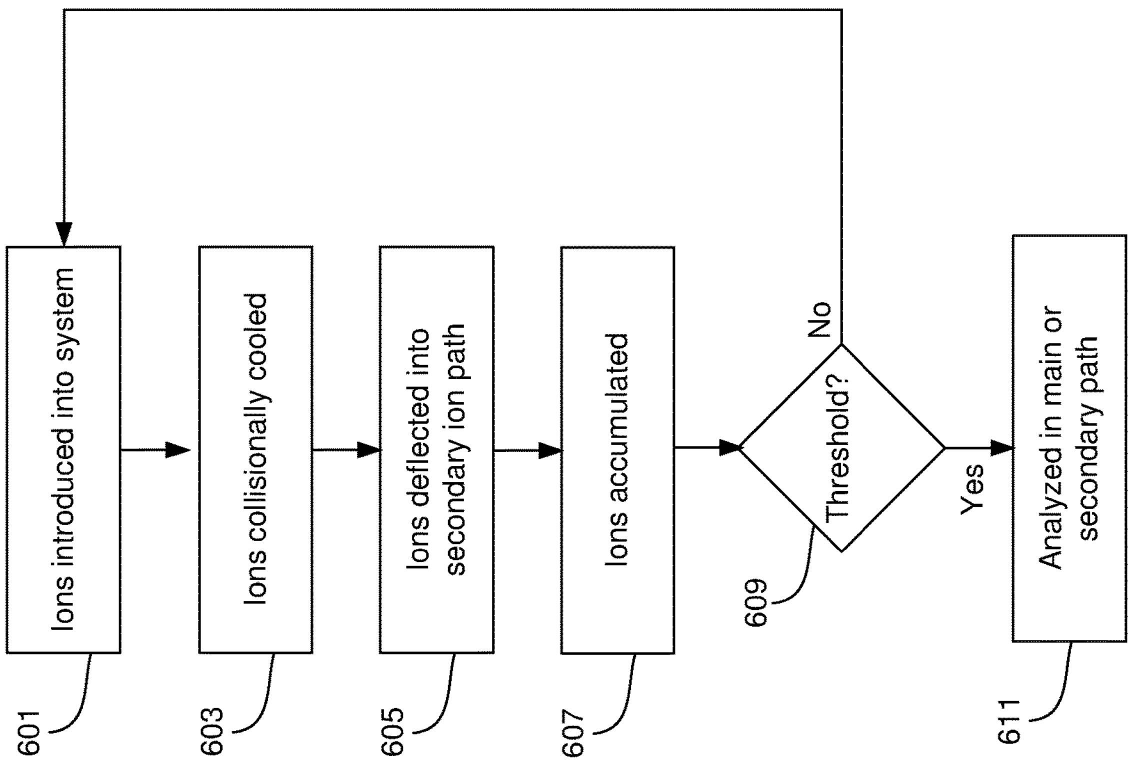
FIG. 6 is a flow chart illustrating a process for multistage mass spectrometry, in accordance with an example embodiment of the disclosure.

FIG. 6 is a flow chart illustrating a process for multistage mass spectrometry, in accordance with an example embodiment of the disclosure. Referring to FIG. 6, starting in step 601, ions may be introduced into the mass spectrometer system via one or more orifice plates and a skimmer followed by step 603 where ions may be collisionally cooled in a low pressure chamber quadrupole.

In step 605, ions may be deflected into the secondary ion path using a turning element or a radial extraction quadrupole, for example, followed by step 607 where ions may be accumulated in an accumulation quadrupole. In step 609, if enough ions have accumulated, meaning a threshold level has been reached, the process continues with step 611 where they are analyzed using an ELIT or CEM, whereas if the number of ions has not reached a threshold level, the process steps back to step 601 to introduce more ions to the system, which may repeat until the threshold is reached.

Figure 7:
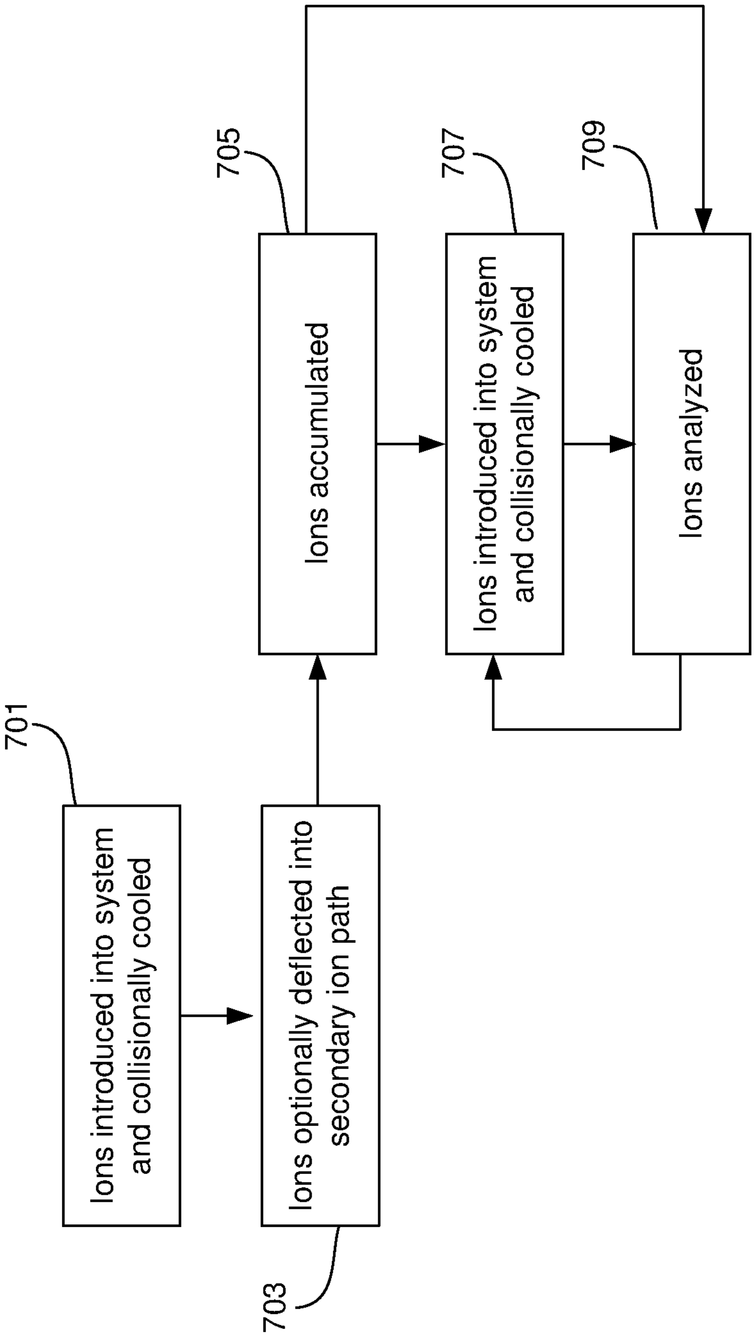
FIG. 7 is a flow chart illustrating an alternative process for multistage mass spectrometry, in accordance with an example embodiment of the disclosure.

FIG. 7 is a flow chart illustrating an alternative process for multistage mass spectrometry, in accordance with an example embodiment of the disclosure. Referring to FIG. 7, starting in step 701, ions may be introduced into the mass spectrometer system via one or more orifice plates and a skimmer, and may be collisionally cooled in a low pressure chamber quadrupole. In step 703, ions may be deflected into the secondary ion path utilizing a turning element or a radial extraction quadrupole, for example. The process may continue in step 705 where the ions deflected into the secondary ion path may be accumulated in an accumulation quadrupole and in step 707 more ions may be introduced into the mass spectrometer system via one or more orifice plates and a skimmer, and may be collisionally cooled in a low pressure chamber quadrupole.

In an example scenario, this second set of ions may be analyzed in step 709, using a CEM, for example. This process may continue repeating ion introduction and analysis while the first set of ions are accumulated in the secondary ion path. This process includes the parallel processing of ions in the secondary ion path while continuing to process ions in the primary ion path, which may be performed concurrently once ions have been diverted into the secondary ion path.

A system and/or method implemented in accordance with various aspects of the present disclosure, for example, provides systems and methods for ion injection into an electrostatic trap. As non-limiting examples, various aspects of this disclosure provide a mass spectrometer system comprising a primary ion path comprising a plurality of quadrupoles; and a secondary ion path coupled to the primary ion path utilizing turning elements. The secondary ion path may comprise an electrostatic linear ion trap (ELIT), the ELIT being operable to analyze ions diverted from the primary ion path and return them to the primary ion path.

A system and/or method implemented in accordance with various aspects of the present disclosure, for example, provides the primary ion path may comprise a time-of-flight mass analyzer. The secondary ion path may be bi-directional. Ions may travel in a first direction when coupled into the secondary ion path using a first turning element in the primary ion path and may travel in a second direction when coupled into the secondary ion path utilizing a second turning element in the primary ion path. The secondary ion path may comprise a collision quadrupole.

A system and/or method implemented in accordance with various aspects of the present disclosure, for example, provides the quadrupole in the secondary ion path may comprise an accumulation quadrupole. The secondary ion path may comprise an injection quadrupole operable to inject ions into the ELIT. One of the plurality of quadrupoles in the primary ion path may comprise a bent quadrupole. The secondary ion path may be operable to cycle ions multiple times before analyzing the ions in the ELIT. The primary ion path may comprise a detector for analyzing ions after passing through the secondary ion path one or more times.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A mass spectrometer system comprising:

a primary ion path comprising a plurality of quadrupoles comprising Q0, Q1, Q2, Q3, and Q4; and a secondary ion path coupled to the primary ion path utilizing turning elements, wherein the secondary ion path comprises an electrostatic linear ion trap (ELIT), the ELIT being operable to analyze ions diverted from the primary ion path and return them to the primary ion path, wherein the turning elements comprise a first turning element and a second turning element, wherein the first turning element is arranged between Q1 and Q2 and the second turning element is arranged between Q3 and Q4.

2. The mass spectrometer system according to claim 1, wherein the primary ion path comprises a time-of-flight mass analyzer.

3. The mass spectrometer system according to claim 1, wherein the secondary ion path is bi-directional.

4. The mass spectrometer system according to claim 1, wherein ions travel in a first direction when coupled into the secondary ion path using a first turning element in the primary ion path and travel in a second direction when coupled into the secondary ion path utilizing a second turning element in the primary ion path.

5. The mass spectrometer system according to claim 1, wherein the secondary ion path comprises a collision quadrupole.

6. The mass spectrometer system according to claim 1, wherein the secondary ion path comprises an accumulation quadrupole.

7. The mass spectrometer system according to claim 1, wherein the secondary ion path comprises an injection quadrupole operable to inject ions into the ELIT.

8. The mass spectrometer system according to claim 1, wherein one of the plurality of quadrupoles in the primary ion path comprises a bent quadrupole.

9. The mass spectrometer system according to claim 1, wherein the secondary ion path is operable to cycle ions multiple times before analyzing the ions in the ELIT.

10. The mass spectrometer system according to claim 1, wherein the primary ion path comprises a detector for analyzing ions after passing through the secondary ion path one or more times.

11. A method for mass spectrometry, the method comprising:

in a mass spectrometry system comprising a primary ion path comprising a plurality of quadrupoles comprising Q0, Q1, Q2, Q3, and Q4, and a secondary ion path coupled to the primary ion path utilizing turning elements:

analyzing, using an electrostatic linear ion trap (ELIT) in the secondary ion path, ions diverted from the primary ion path unto the secondary ion path by a first turning element; and returning the ions to the primary ion path using a second turning element, wherein the first turning element is arranged between Q1 and Q2 and the second turning element is arranged between Q3 and Q4.

12. The method according to claim 11, wherein the primary ion path comprises a time-of-flight mass analyzer.

13. The method according to claim 11, wherein the secondary ion path is bi-directional.

14. The method according to claim 11, comprising directing ions to travel in a first direction when coupled into the secondary ion path using a first turning element in the primary ion path and directing ions to travel in a second direction when coupled into the secondary ion path utilizing a second turning element in the primary ion path.

15. The method according to claim 11, wherein the secondary ion path comprises a collision quadrupole.

16. The method according to claim 11, wherein the secondary ion path comprises an accumulation quadrupole.

17. The method according to claim 11, comprising injecting ions into the ELIT using an injection quadrupole in the secondary ion path.

18. The method according to claim 11, wherein one of the plurality of quadrupoles in the primary ion path comprises a bent quadrupole.

19. The method according to claim 11, comprising cycling ions multiple times through the secondary ion path before analyzing the ions in the ELIT.

20. The method according to claim 11, comprising analyzing ions using a detector in the primary ion path after passing through the secondary ion path one or more times.

* * * * *